No. 611,922. Patented Oct. 4, 1898.
T. MIDGLEY & L. FINK.
PROCESS OF BRAZING OR SOLDERING METALS.
(Application filed Apr. 1, 1898.)
(No Model.)
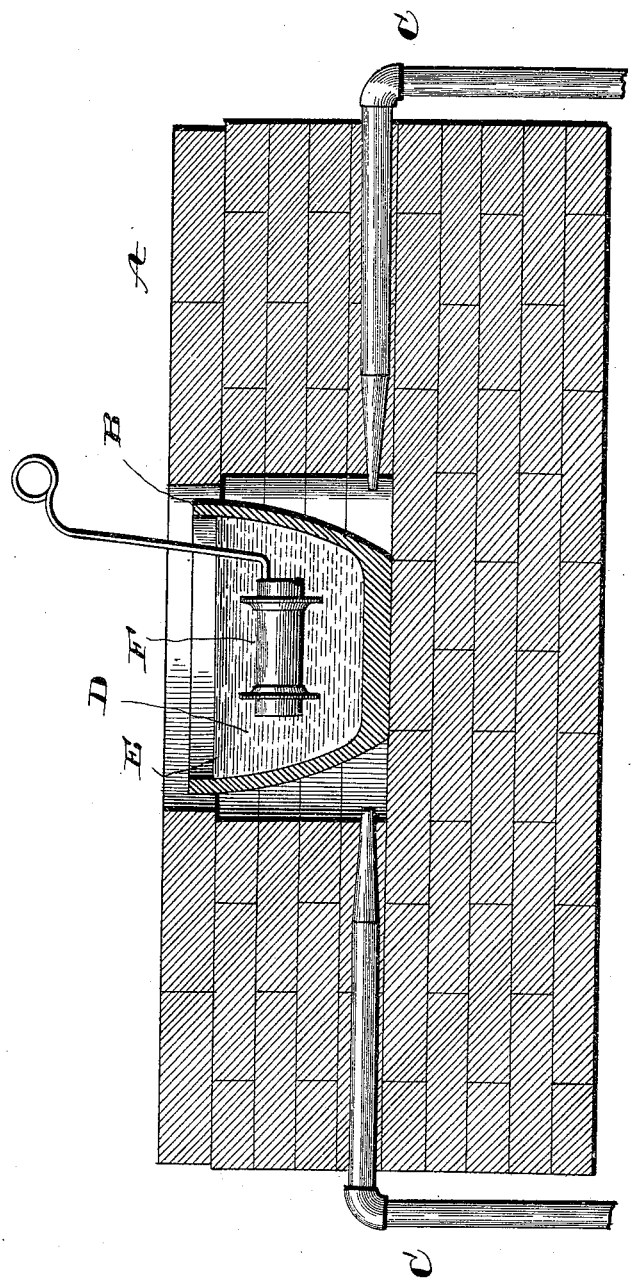
Witnesses
G. A. Pauberschmidt,
D. Wenner Reinohl
Inventors
Thomas Midgley,
Lewis Fink,
By D. L. Reinohl,
Attorney.

UNITED STATES PATENT OFFICE.

THOMAS MIDGLEY AND LEWIS FINK, OF COLUMBUS, OHIO, ASSIGNORS OF ONE-HALF TO THE COLUMBUS BICYCLE COMPANY, OF SAME PLACE.

PROCESS OF BRAZING OR SOLDERING METALS.

SPECIFICATION forming part of Letters Patent No. 611,922, dated October 4, 1898.

Application filed April 1, 1898. Serial No. 676,116. (No specimens.)

*To all whom it may concern:*

Be it known that we, THOMAS MIDGLEY and LEWIS FINK, citizens of the United States, residing at Columbus, in the county of Franklin and State of Ohio, have invented certain new and useful Improvements in Processes of Brazing or Soldering Metals; and we do hereby declare the following to be a full, clear, and exact description of the invention, such as will enable others skilled in the art to which it appertains to make and use the same.

Our invention relates to brazing metals, and has for its object certain improvements for expediting the work; and it consists in a novel process of brazing or soldering, which will be fully disclosed in the following specification and claim.

In the accompanying drawing, which forms part of this specification, we have shown a vertical section, partly in elevation, of a furnace, a crucible in position, means for heating the crucible, and a bicycle-wheel hub in the brazing-bath in the crucible.

Reference being had to the drawing and the letters thereon, A indicates the masonry of an ordinary brass-founder's furnace; B, a crucible in the well of the furnace; C C, the gas and blast supply pipes.

In the crucible is a bath or brazing compound consisting of a body of molten metal D, composed of copper and zinc in the usual proportions or any suitable brazing or soldering alloy, and upon the surface of the molten metal D is a superposed body of flux E, consisting of a borate, such as borax or boracic acid for a brazing compound or any of the fluxes used for soldering when a soldering-bath is used.

The brazing or soldering alloy is maintained at a temperature to keep it in a molten state and to prevent its being chilled by the articles immersed in the bath for brazing or soldering, and the flux is maintained at the temperature of the bath by contact therewith.

The flux is preferably placed upon the surface of the molten bath for economy of operation; but it is obvious that for some purposes it may be heated and used in a separate vessel.

For the purpose of illustration F indicates the hub of a bicycle-wheel immersed in the bath D.

The articles or joints to be brazed are prepared in the usual way—namely, by carefully removing all grease or other foreign matter, then assembling the parts and securing them in position by suitable means, such as pins or clamps. The article or joint is then preferably passed down through the flux E, which is maintained at a depth of three or four inches and properly fluxed. Then without exposure to the atmosphere it is immersed in the molten metal and allowed to remain until the metal or parts to be brazed or soldered have all reached the same temperature, when the article is slowly withdrawn from the bath and without exposure to the atmosphere allowed to remain in the superposed body of flux a determinate time either by permitting it to rest in the flux or moving it through the flux more slowly when it is withdrawn from the molten metal, the effect of which is that the chemical action of the flux at its high temperature drains or wipes off the surplus metal adhering to the article without loss of metal and produces a clean bright finish with all the crevices and pores of the article filled, and the surfaces have nothing more than a thin film or wash on them, the borate having acted as a stripper to the excess of metal on the surface and the surfaces being in a superior condition for a subsequent coating of metal by electroplating or nickel-plating or galvanizing.

By immersing the articles or parts to be brazed in the molten bath the atmosphere is excluded and the formation of scale or oxidation prevented, and the joints are brazed or soldered at a greatly-reduced cost by the saving of time and labor.

Having thus fully described our invention, what we claim is—

The process of brazing or soldering metals, which consists in immersing the joint in a bath of molten metal through a superposed body of flux, then stripping or wiping off the excess of metal by subjecting the joint to the action of the said body of flux for a determinate time while being withdrawn from the bath of molten metal.

In testimony whereof we affix our signatures in presence of two witnesses.

THOMAS MIDGLEY.
LEWIS FINK.

Witnesses:
JOHN R. YOUNG,
H. D. FREEMAN.